US010701904B2

(12) United States Patent
Chou

(10) Patent No.: US 10,701,904 B2
(45) Date of Patent: Jul. 7, 2020

(54) LEASH ATTACHED DEVICE AND METHOD FOR RETAINING PET DROPPINGS

(71) Applicant: Jesse L Chou, Santa Ana, CA (US)

(72) Inventor: Jesse L Chou, Santa Ana, CA (US)

( * ) Notice: Subject to any disclaimer, the term of this patent is extended or adjusted under 35 U.S.C. 154(b) by 0 days.

(21) Appl. No.: 16/121,639

(22) Filed: Sep. 5, 2018

(65) Prior Publication Data

US 2019/0069524 A1 Mar. 7, 2019

Related U.S. Application Data

(60) Provisional application No. 62/553,827, filed on Sep. 2, 2017.

(51) Int. Cl.

| | |
|---|---|
| ***A01K 27/00*** | (2006.01) |
| ***E01H 1/12*** | (2006.01) |
| *A01K 23/00* | (2006.01) |

(52) U.S. Cl.

CPC ............. *A01K 27/008* (2013.01); *E01H 1/12* (2013.01); *A01K 23/005* (2013.01); *E01H 2001/1273* (2013.01); *E01H 2001/1286* (2013.01)

(58) Field of Classification Search

CPC .... A01K 27/008; A01K 23/005; A01K 23/00; A01K 23/008; E01H 1/12; E01H 2001/1273; E01H 2001/1286; Y10T 24/1394; Y10T 24/3416; A45F 5/021

USPC ......... 248/51, 316.7, 682, 693, 95; 119/867, 119/868; 224/673, 666, 667, 668, 671

See application file for complete search history.

(56) References Cited

U.S. PATENT DOCUMENTS

| | | | | | |
|---|---|---|---|---|---|
| 4,414,716 | A * | 11/1983 | Stastney | A41F 1/00 | 24/3.12 |
| 5,056,696 | A * | 10/1991 | Lahr | A45F 5/02 | 224/148.4 |
| 5,441,017 | A * | 8/1995 | Lindsay | A01K 27/003 | 119/161 |
| 6,454,119 | B1 * | 9/2002 | Demeur | A45F 5/02 | 220/475 |
| 6,695,269 | B1 * | 2/2004 | Anscher | A45C 13/30 | 224/269 |
| 7,320,420 | B2 * | 1/2008 | Buis | F41C 33/02 | 224/192 |
| 8,312,599 | B2 * | 11/2012 | Vogl | A01K 27/006 | 24/132 AA |

* cited by examiner

*Primary Examiner* — Alfred J Wujciak

(57) ABSTRACT

The present invention relates to a novel device and method for the retention of bags containing pet waste. The device is suitable for attachment to most types of pet leashes. The device consists of a single piece of material that is retained via friction to the leash, and which features a channel for the easy insertion and retaining of knotted bags of pet waste.

19 Claims, 5 Drawing Sheets

LEASH ATTACHED DEVICE AND METHOD FOR RETAINING PET DROPPINGS

FIELD OF THE INVENTION

The present invention relates to a device and method for the retention of bags containing pet waste, the device being suitable for attachment to strap type leash and other pet leashes.

BACKGROUND

The disposal of solid pet waste is a chore that is familiar to most dog owners, and the owners of some other types of pets as well. There are some locations where solid waste need not be displaced after being passed. However, pets frequently heed the call of nature in locations where it is either conscientious or indeed a legal requirement to remove feces to be properly disposed of elsewhere. Pet waste on streets, sidewalks, or on any lawns but those used exclusively by the owner of the pet would generally fall into the latter category.

Thus it is the case that most pet owners carry plastic bags on walks, and are intimately familiar with the process of scooping solid waste into a bag, inverting, and then sealing the bag with a knot, or a similar process with the result of solid waste being retained in a bag.

After solid waste has been secured in a bag, a fortunate pet owner may have immediate access to a trash bin or other suitable receptacle for the waste bag. However, a suitable receptacle is often not readily accessible. If this is the case, the pet owner has several options, none of them optimal. The first option is to simply carry the waste-bag in their free hand. Many people consider this an uncomfortable choice, and walking around holding a bag of feces can result in socially awkward situations. Another option is to place the bag in a jacket or pant pocket, but this option is generally considered uncomfortable as well. Another choice is to knot the waste bag to the pet leash. This option can be more attractive, but a too tightly tied knot can be impossible to release without accidentally rupturing the bag; and a too loosely tied knot can slide down the leash and crash into a pet's back, possibly coming undone in the collision—a very unpleasant prospect.

There exist other devices that have been devised to secure waste to pet leashes. However, these devices have shortcomings in terms of their method of retention to the leash, the method by which the hold or release a waste bag, or in their durability. Therefore, a need exists for a novel device for the retention of pet waste.

BRIEF SUMMARY OF THE INVENTION

The present invention relates to a novel device for retaining waste bags that can be attached to a pet leash. In one embodiment, after being secured to a pet leash, the device is held in place by friction, and keeps its position secure on the leash even when laden with one or more waste filled bags. The device may be comprised of a single piece of material. The device attaches to a pet leash by slotting the leash through grooves on the sides of the device. The device is shaped in such a way as to be fixed into place on the leash through the force of friction, although other securing means may be employed. One embodiment of the device features a central channel into which knotted bags of pet waste can be inserted; the channel being sufficiently wide to allow a bag to be inserted, but not sufficiently wide to allow a typically-sized handmade knot in the bag to pass through. The size of the device varies between embodiments of the invention, with different embodiments designed to slot onto leashes of varying widths.

BRIEF DESCRIPTION OF THE DRAWINGS

FIG. 1 B shows a top/bottom plan view of a pet waste carrying device constructed in accordance with an implementation of the invention with arrows depicting forces exerted by the pet leash on the device resulting in friction that retains the device in position along the leash.

Attachment 1 includes photographs of one embodiment of a device and method for attaching one or more bags of pet waste to a leash.

Attachment 2 is a discussion of an embodiment of the invention.

Attachment 3 is a discussion of possible alternative designs of a device according to the present invention.

DETAILED DESCRIPTION AND BEST MODE OF IMPLEMENTATION

In the following description, numerous specific details are set forth so as to provide a thorough understanding of the present invention. However, various possible implementations of the invention are possible, and the present disclosure is to be considered an exemplification of the invention, and is not intended to limit the invention to the specific embodiments illustrated by the figures or description below.

The device comprises a single piece of material. The material is shaped in such a way as to attach securely into place on a pet leash, where it is held in place via friction. The center of the device is marked by a channel to retain waste bags. The device will now be described by referencing the appended figures.

Figure 1:
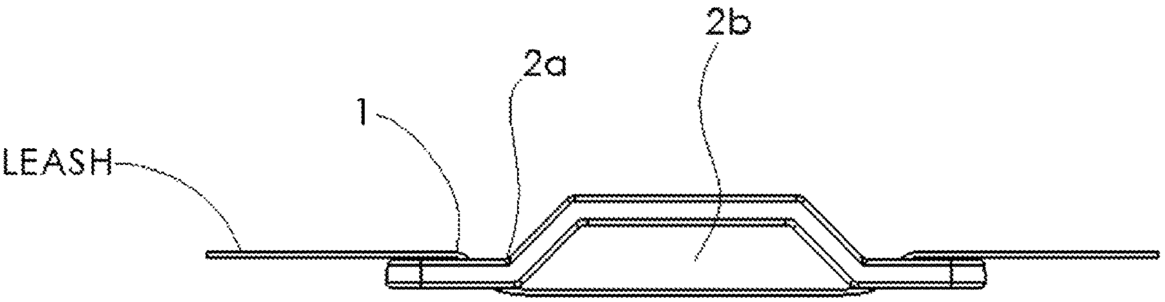
FIG. 1 A shows a top/bottom plan view of a pet waste carrying device constructed in accordance with an implementation of the invention.
Figure 1:
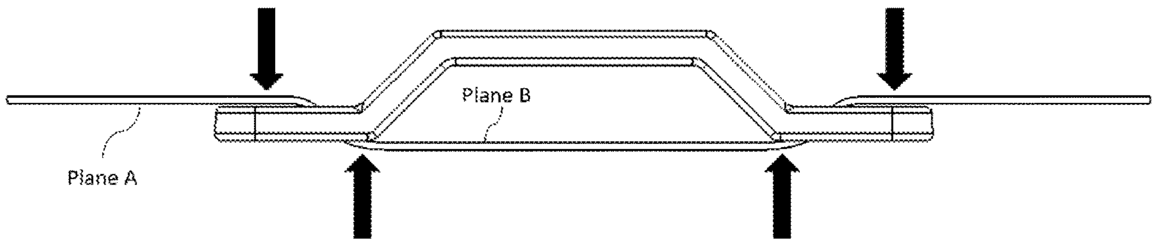

The general shape of the invention can be described as having five planes, as is visible in FIG. 1 A. FIG. 1 A depicts a top down perspective of the device. Depicted in figure one is the leash 1 bending as a result of the shape of the device, imparting opposing forces on the device. Through the opposing forces, friction and retention of the device in its desired location is achieved. The device is angled 2*a* to create empty space 2*b* between the device and leash for placement of the knotted waste bag. Open space 2*b* allows one-handed operation of the device. Without it, the user would have to first pull back the leash to allow a knotted waste bag to be inserted into the bag retaining channel.

The opposing forces imparted on the device by the leash are depicted in FIG. 1 B. Displacement of the natural path of the leash by the device creates opposing forces which utilize a frictional effect to secure the device in any desired place along the length of the leash. The static friction coefficient on planes A and B between the device and leash cause the device to stay in position along the leash even when loaded with a force in a direction parallel with the leash.

Figure 2:
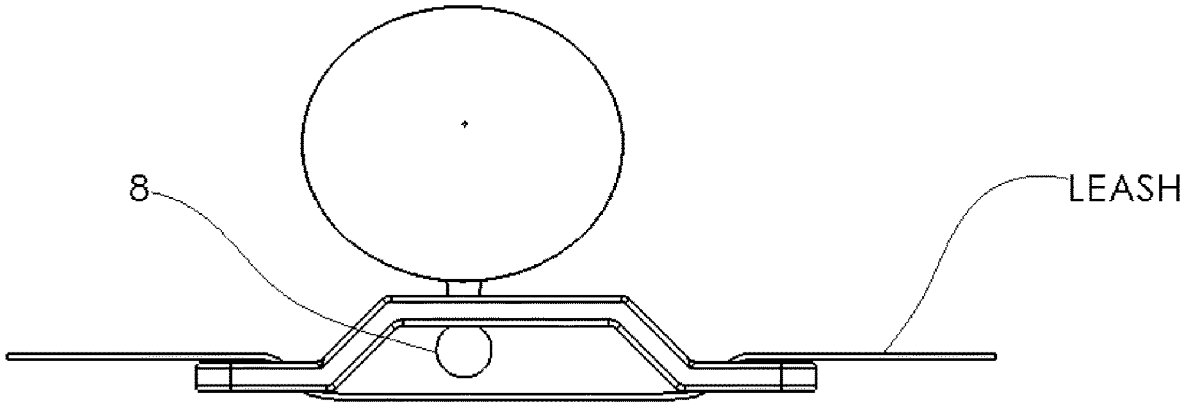
FIG. 2 shows a top/bottom plan view of a pet waste carrying device constructed in accordance with an implementation of the invention while in use.

The invention is depicted in use in FIG. 2. In this figure, the knot 8 is depicted in its position between the device and the leash. In this position, the used waste bag is kept in place by the knotted mass of the bag being unable to cross through the device due to the designed dimensions of the tortuous channel.

Figure 3:
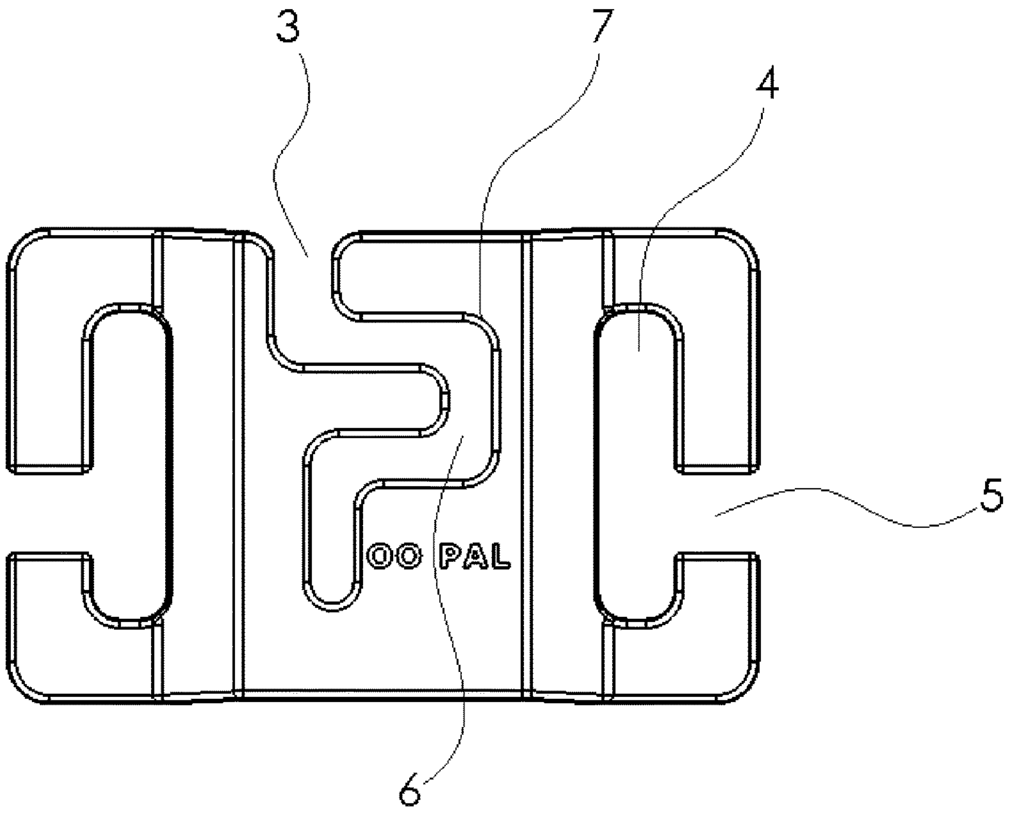
FIG. 3 shows a front plan view of a pet waste carrying device constructed in accordance with an implementation of the invention.
Figure 5:
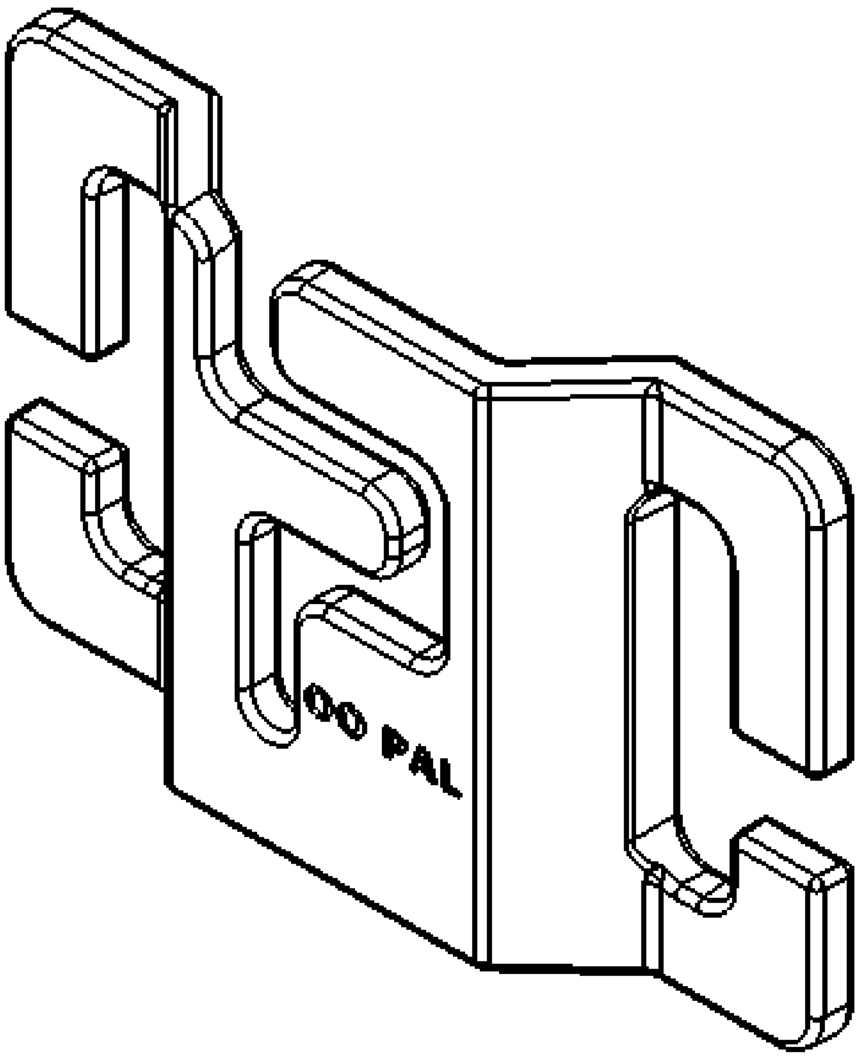
FIG. 5 shows an isometric perspective view of the front of a pet waste carrying device constructed in accordance with an implementation of the invention.

The features of the five planes that comprise the device are clearly visible in FIG. 3. From left to right, the first and fifth plane feature leash channels 4 through which the leash is threaded and by which the device is retained in place on the leash by frictional forces. In a preferred embodiment, the width of these spaces is one inch to fit standard leashes; other embodiments allow for other widths of leashes. The channels are open to the end of the device by insertion gaps 5 for the leash. The gap is dimensioned to allow the desired width of leash to be inserted with minimal effort. The leash is inserted one end first then bent slightly to force the other end into the gap. The position of the gap 5 is offset from center, because if placed too central to the leash channel 4, the leash cannot be inserted. Adjacent to these outside planes are the second and fourth plane, which are angled to raise the center plane above the outside planes. The primary feature of the center plane is the channel 3 for the insertion of the knotted waste bag. The channel 3 is designed to be tortuous in path 6, preventing the knotted bag from escaping once situated by the user. The width of the path 6 is dimensioned to allow a knotted bag to slide through the channel but retain the knot on the side of the device between the leash and the device. The approximate dimension of path 6 is 0.140 inches or 3.5 millimeters in height. The edges of the channel 3 are rounded 7 to prevent excessive friction on the walls of the knotted waste bag. The general shape of the device is most easily perceived from the isometric perspective presented in FIG. 5.

Figure 4:
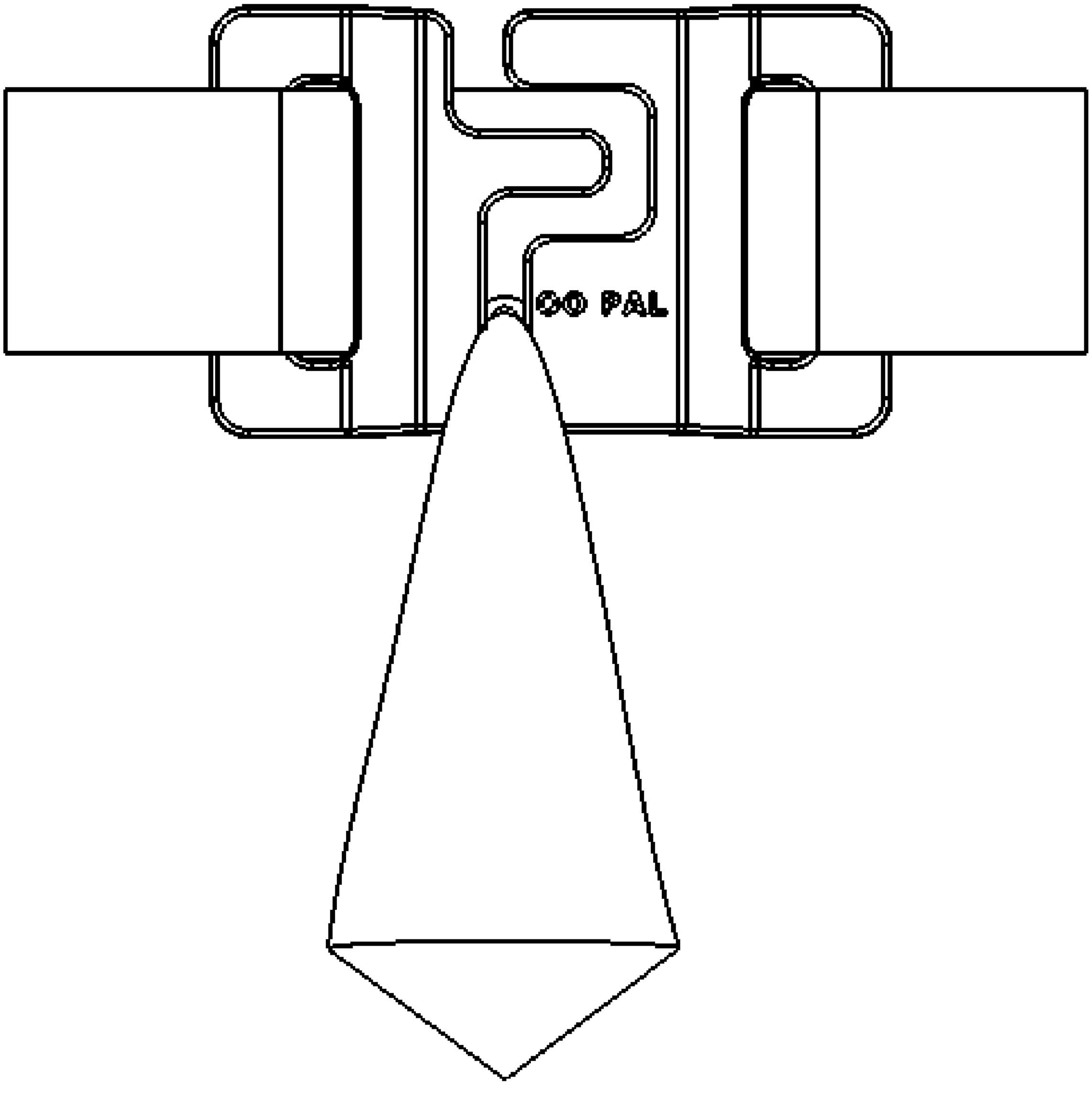
FIG. 4 shows a front plan view of a pet waste carrying device constructed in accordance with an implementation of the invention while in use.

The device is depicted in use in FIG. 4. It can be perceived that the device is secured to a leash which runs through the two leash retention channels on the outside of the device. A bag of waste is also depicted being retained by the tortuous channel.

Figure 6:
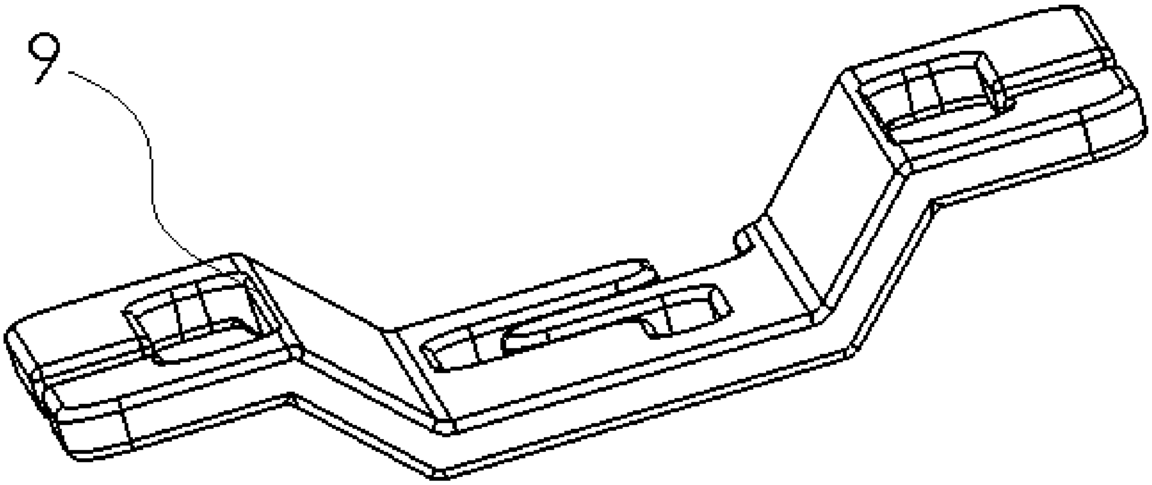
FIG. 6 shows an isometric perspective view of the back of a pet waste carrying device constructed in accordance with an implementation of the invention.

FIG. 6 depicts the abrupt corners 9 of the device which are designed to increase friction between the device and the leash to accomplish retention of the device in the desired position along the leash during regular use.

Material properties of the device are critical to its function and durability. FIG. 1B depicts the forces exerted on the various planes of the device as the leash is placed under tension. The resulting forces cause the device to flex, allowing the leash to return to a straight configuration, as opposed to its natural state of being displaced by the shape and material of the device when the device is attached to the leash. A leash under tension can break the device if the material cannot plastically deform. Polypropylene plastic was chosen as the material of construction as it allows the device to elastically deform within the range of deflection caused by leash straightening under tension when force is applied by an excited or motivated canine and resisted by its caretaker. Other thermoplastics like Nylon, polyethylene, ABS, etc., may also be used to construct the device. In general, materials that are resistant to catastrophic failure upon deformation may be used to construct the device. Metals, by the aforementioned criteria, may also be used to construct the device.

The device may be fabricated via injection molding of polypropylene resin, or by other methods known in the art. Alternative thermoplastic resins may also be used in lieu of polypropylene. If metal is selected as the material of construction, fabrication methods such as CNC machining or casting may also be employed. Additive manufacturing methods such as selective laser sintering, stereolithography, fused deposition modeling, etc., may also be employed to fabricate the device.

Attachment 1 is a series of photo of an embodiment of a waste bag-retaining device according to the present invention. Commenting on photos from the upper left and moving clockwise, the first photo illustrates a device through which a leash has been threaded. The second photo shows the device of the first photo retaining a bag that contains pet waste. In the same photo, the leash is threaded through an alternative design of a device.

The third photo (upper right) illustrates the embodiment of the first photo. A bag filled with pet waste is affixed to the device. In this photo, the bag is knotted. The portion of the bag that contains the pet waste is on one side of the device. A slot on the device prevents the knot from passing through the slot, thus retaining the bag on the device an therefore on the leash. This is further illustrated in the fourth photograph.

The fifth photo illustrates multiple bags of pet waste being affixed to a device according to the present invention. Similarly, the sixth photo (bottom right) illustrates the multiple bags of pet waste affixed to the leash, and the dog and walker continuing on their walk.

Although the present invention has been illustrated and described herein with reference to the preferred embodiments and specific examples thereof, it is to be understood that these references are intended to be illustrative and not restrictive. All other embodiments and examples within the spirit and scope of the present invention are contemplated thereby, and are intended to be covered by the following claims.

What is claimed is:

1. A device for retaining bags containing pet waste which comprises:

a single piece of material, angled along one axis on four points of the material, thus forming five planes;

the outside planes of the material, planes one and five, of the device, which are in line with one another;

the center plane of the material, plane three, which is raised above the outside planes but which runs parallel to the outside planes;

the second and fourth planes of the material, which are angled relative to the other planes, and which raise the center plane to above the outside planes;

a vacant space is created below the raised center plane;

channels in the outside planes of the device and wherein a leash is inserted in one of the channels to pass through the vacant space and exit the other channels;

gaps in the material of the device which join the outside of the planes to the channels through which the leash may be passed; and a tortuous channel running through the center plane of the material into which the bag being secured within the channel with knotted of the bag resting on a top surface of the center plane.

2. A device as defined in claim 1, wherein the device is formed from a thermoplastic material.

3. A device as defined in claim 1, wherein the device has a leash-engaging surface, the leash-engaging surface having bumps to increase friction between a leash and the device.

4. A device as defined in claim 1, wherein the fourth portion includes a path having a width adapted to be sufficient to allow a knotted pet waste bag to slide through the slot while sufficiently narrow to retain a knot in between the leash and the device.

5. A device as defined in claim 4, wherein the device is formed from a thermoplastic material.

6. A device as defined in claim 4, wherein the device is adapted to retain the leash with friction.

7. A device as defined in claim 4, wherein the fourth portion includes a path having a width sufficient to allow a knotted pet waste bag to slide through the slot but sufficiently narrow to retain a knot in between the leash and the device.

8. A device as defined in claim 4, wherein the slot includes rounded edges to prevent excess friction between the waste bag and the edges of the slot.

9. A device as defined in claim 4, wherein the device is flexible.

10. A device as defined in claim 4, wherein when the leash is secured to the device, there is space between the raised center plane and the leash to receive a knot of the knotted pet waste bag.

11. A device as defined in claim 4, wherein the device has a leash-engaging surface, the leash-engaging surface having bumps to increase friction between a leash and the device.

12. A device as defined in claim 4, wherein the first and third portions that each having a leash slot are generally U-shaped, having an open end.

13. A device as defined in claim 4, wherein the first and third portions that each have a leash slot have an opening on a side of each to receive the leash.

14. A device as defined in claim 1, wherein the slot includes rounded edges to prevent excess friction between the waste bag and the edges of the slot.

15. A device as defined in claim 1, wherein the device is flexible.

16. A device as defined in claim 1, wherein the first and third portions that each having a leash slot are generally U-shaped, having an open end.

17. A device as defined in claim 16, wherein the the path is sufficiently long to accommodate multiple pet waste bags.

18. A device as defined in claim 1, wherein the first and third portions that each have a leash slot have an opening on a side of each to receive the leash.

19. A device for retaining bags containing pet waste on a leash, which comprises:

a single piece of material, angled along one axis on four points of the material, thus forming five planes;

outside planes of the material, planes one and five, of the device, which are in line with one another;

a center plane of the material, plane three, which is raised above the outside planes but which runs parallel to the outside planes;

second and fourth planes of the material, which are angled relative to the other planes, and which raise the center plane to above the outside planes;

vacant space created below the center plane, and channels in the outside planes of the device through which a leash may be passed;

gaps in the material of the device which join the outside of the planes to the channels through which the leash may be passed;

a tortuous channel comprising a slot having a first portion that extends generally perpendicular to the longitudinal axis of the device, a second portion that extends from the first portion and generally parallel to the longitudinal axis of the device, a third portion extending from the second portion and generally perpendicular to the longitudinal axis of the device, and at least a fourth portion extending generally parallel to the longitudinal axis of the device and adapted to retain a knotted bag containing pet waste, the tortuous channel running through the center plane of the material the bag being secured within the channel with knotted of the bag resting on a top surface of the center plane;

wherein a leash is inserted in one of the channels to pass through the vacant space and exit the other channels to be secured to the device.

* * * * *